(12) United States Patent
Christmas

(10) Patent No.: US 12,619,070 B2
(45) Date of Patent: May 5, 2026

(54) HOLOGRAM WAVEGUIDING

(71) Applicant: Envisics Ltd, Milton Keynes (GB)

(72) Inventor: Jamieson Christmas, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 343 days.

(21) Appl. No.: 18/335,833

(22) Filed: Aug. 30, 2023

(65) Prior Publication Data

US 2024/0036308 A1 Feb. 1, 2024

(51) Int. Cl.
*G02B 27/00* (2006.01)
*G02B 27/10* (2006.01)
*G02B 27/01* (2006.01)

(52) U.S. Cl.
CPC ..... *G02B 27/0081* (2013.01); *G02B 27/0093* (2013.01); *G02B 27/1026* (2013.01); *G02B 2027/0109* (2013.01)

(58) Field of Classification Search
CPC ........... G02B 27/0081; G02B 27/0093; G02B 27/1026; G02B 2027/0109
USPC .......................................................... 359/9
See application file for complete search history.

(56) References Cited

U.S. PATENT DOCUMENTS

| | | |
|---|---|---|
| 11,592,664 B2 | 2/2023 | Christmas |
| 2012/0002256 A1 | 1/2012 | Lacoste |
| 2019/0353759 A1* | 11/2019 | Christmas ............. G01S 7/4817 |
| 2020/0264378 A1 | 8/2020 | Grant et al. |
| 2021/0165212 A1* | 6/2021 | Christmas ............ G03H 1/2249 |
| 2021/0255459 A1 | 8/2021 | Jamieson |
| 2022/0252879 A1 | 8/2022 | Christmas et al. |
| 2023/0324705 A1 | 10/2023 | Christmas et al. |

OTHER PUBLICATIONS

Search Report in United Kingdom, Patent Application No. GB2211097.7, dated Jan. 27, 2023.

* cited by examiner

*Primary Examiner* — Stephone B Allen
*Assistant Examiner* — Boutsikaris Leonidas
(74) *Attorney, Agent, or Firm* — McDonnell Boehnen Hulbert & Berghoff LLP

(57) ABSTRACT

A projection system comprising a display device, a hologram engine and a waveguide. The display device is arranged to display a hologram of an image and spatially modulate light in accordance with the hologram to form a holographic wavefront. The hologram engine is arranged to calculate the hologram. The hologram is arranged to angularly distribute light within the holographic wavefront in accordance with spatial position within the image such that continuous angular ranges of the holographic wavefront respectively correspond with continuous regions of the image. The waveguide comprising a pair of parallel reflective surfaces arranged to waveguide the holographic wavefront therebetween. A first surface of the pair of parallel reflective surfaces is partially reflective-transmissive so as to form an output comprising a plurality of emission zones for the holographic wavefront. The hologram engine is arranged to modify the hologram to at least partially compensate for a decrease in intensity of the emission from each successive emission zone of the waveguide caused by the partial reflection-transmissions at the first surface during waveguiding.

20 Claims, 10 Drawing Sheets

300

300

540

520

526b 524b 524a
526a

522

530 y x z 701   702   703   704   705   706   707   708

710

700

900

| 901 | 902 | 903 | 904 | 905 | 906 | 907 | 908 |

— 950

900'

| 901' | 902' | 903' | 904' | 905' | 906' | 907' | 908' |

— 951

910'

— 952

920'

| 911' | 912' | 913' | 914' | 915' | 916' | 917' | 918' |

FIGURE 9

HOLOGRAM WAVEGUIDING

FIELD

The present disclosure relates to a light engine and a method of relaying a diffracted light field. More specifically, the present disclosure relates a projection system and a method of replicating a hologram using a waveguide. Some embodiments relate to a holographic projector, picture generating unit or head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

Broadly, there is disclosed herein a display system comprising a display device, a pattern generator and a waveguide. The display device is arranged to display a diffractive pattern corresponding to an image and spatially modulate light in accordance with the diffractive pattern to form a diffracted light field. The pattern generator is arranged to determine the diffractive pattern. The diffractive pattern is arranged to angularly distribute light within the diffracted light field in accordance with spatial position within the image such that continuous angular ranges (i.e. angular channels) of the diffracted light field respectively correspond with continuous regions of the image. The waveguide comprising a pair of parallel reflective surfaces arranged to waveguide the diffracted light field therebetween. A first surface of the pair of parallel reflective surfaces is partially reflective-transmissive so as to form an output comprising a plurality of emission or replication zones for the diffracted light field (in the direction of waveguiding). The pattern generator is arranged to modify the diffractive pattern to at least partially compensate for a decrease in intensity of the emission from each successive emission or replication zone of the waveguide caused by the partial reflection-transmissions at the first surface during waveguiding.

More specifically, there is disclosed herein a projection system comprising a display device, a hologram engine and a waveguide. The display device is arranged to display a hologram of an image and spatially modulate light in accordance with the hologram to form a holographic wavefront (or holographic light field). The hologram engine is arranged to calculate the hologram. The hologram is arranged to angularly distribute light within the holographic wavefront in accordance with spatial position within the image such that continuous angular ranges (i.e. angular channels) of the holographic wavefront respectively correspond with continuous regions of the image. The waveguide comprising a pair of parallel reflective surfaces arranged to waveguide the holographic wavefront therebetween. A first surface of the pair of parallel reflective surfaces is partially reflective-transmissive so as to form an output comprising a plurality of emission zones for the holographic wavefront (in the direction of waveguiding). The hologram engine is arranged to modify the hologram to at least partially compensate for a decrease in intensity of the emission from each successive emission zone of the waveguide caused by the partial reflection-transmissions at the first surface during waveguiding.

The inventor has identified that the hologram engine can compensate for the decreasing intensity of the waveguide emissions such that a complex graded coating is not required on the output surface of the waveguide. This solution is possible because of the way the hologram distributes the content of the image in the spatial domain by angle in the hologram domain. This type of hologram behaviour is not usual and the inventor has utilized a characterizing feature thereof to solve a fundamental problem of the waveguide pupil expander. In this respect, it may be said that the inventor has identified a synergy between the so-called channelling hologram of this disclosure and delivery of the holographically-encoded light to a viewer via a pupil expander based on waveguiding. The holographic-encoded light (i.e. the holographic wavefront or light field) is transformable by a viewer (e.g. using the lens of an eye) into a meaningful image. The present disclosure represents a significant divergence from conventional techniques which have relied on designing dielectric stacks for moderating the intensity of the waveguide emissions. These stacks are particularly complex to manufacture when they need to operate over a broadband of wavelengths, such as over the visible spectrum, because it is necessary to either allow the thickness of at least some layers of the stack to change with propagation distance or use a huge number of different layers.

In some embodiments, the angular distribution of light in the hologram domain and the correspondence with the image content in the spatial domain is in a common direction such as one-dimension of the projection system. The angular channels of the holographic wavefront formed by the hologram may extend in a plane. In some embodiments, the angular channels extend in the direction of waveguiding and/or pupil replication/expansion. However, more complex correlations between the angular channels and image content—falling within the scope of the present disclosure—are formed when a non-uniform optical combiner (e.g. vehicle windscreen) is used in the optical system. These correlations, however complex, may be identified or mapped by techniques such as ray tracing.

The projection system may be arranged to form a plurality of viewing positions within a viewing region. The term "plurality of viewing positions" is merely used to reflect that there is more than one possible viewing position and each viewing position can receive the entire holographic light field. The viewer can therefore see the full field of view of the image from all viewing positions. The term "plurality of viewing positions" is not used herein to reflect that there is a finite number of viewing positions. There may be an infinite number of possible viewing positions. The viewing positions may define or fall within a viewing window, area or volume. In the application of head-up display, the viewing window is called an eye-box and the viewing positions are called eye-box positions. The viewer (or, more broadly, viewing system) may comprise an entrance pupil or viewing pupil. The entire holographic wavefront is receivable through a viewing pupil at each viewing position. However, notably, different continuous angular ranges of the holographic wavefront are receivable through the viewing pupil from different emission zones of the waveguide, as explained in the detailed description that follows.

At least partially compensating for the decrease in intensity of the emission from each successive emission zone may comprise changing (e.g. uniformly increasing or decreasing) the intensity of at least one angular channel of the holographic wavefront. The intensity of an angular channel may be changed by changing the intensity of the corresponding image section before hologram calculation or changing the intensity of image points (or the waves propagated therefrom) whilst building up a point cloud hologram or by any other conceivable technique. Changing the intensity may comprise applying a gain or loss factor—e.g. to image pixel values, image points or propagated light waves before, during or after hologram calculation.

At least partially compensating for the decrease in intensity of the emission from each successive emission zone may comprise changing the intensity of at least continuous region of a target image of the hologram prior to calculation of the hologram. Changing the intensity may comprise applying a gain or loss factor.

Calculation of the hologram may comprise a plurality of iterations of a phase retrieval algorithm and/or a point cloud method but the person skilled in the art of holography will understand that other techniques for hologram calculation may be compatible with the present disclosure.

A second surface of the pair of parallel reflective surfaces may be substantially fully reflective. However, this is not an essential feature and the present disclosure may be readily adapted to compensate for imperfect reflection from the second surface during waveguide.

The projection system may further comprising a viewer tracking system arranged to determine a location of a viewer within a viewing window downstream of the waveguide. The hologram engine may be arranged to identify a correlation between angular channels of the holographic wavefront and the emission zones based on the determined location of the viewer. In some embodiments, a look-up table of data (like Table 1 that follows in the detailed description) is determined—prior to the core method of the present disclosure—using e.g. ray-tracing. The correlation may depend on viewing position and other properties of the viewer, or viewing system, such as interpupil distance. There may be a one-to-one or one-to-many correlation between the emission zones and image sections. The size of the image sections may be constant or variable. The size of the image sections may also depend on properties of the viewing system such as interpupil distance.

There is also disclosed herein a method of head-up display for a vehicle. The method comprising a first, second and third step which may be performed in order. The first step comprises displaying a hologram of an image on a display device and spatially modulating light in accordance with the displayed hologram to form a holographic wavefront. The second step comprises replicating the holographic wavefront in a first direction using a first pupil expander to form a 1D array of replicas of the holographic wavefront. The third step comprises using a windscreen of the vehicle as a second pupil expander to form a 2D array of replicas of the holographic wavefront from the 1D array of replicas.

The inventor has recognised that the second waveguide and optical combiner may be combined. More specifically, the inventor has surprisingly found that the two surfaces of a vehicle windscreen (more broadly, a transparent optical combiner) are sufficiently able to provide the functionality of the second waveguide. That is, the two surfaces of the vehicle windscreen are able to waveguide therebetween a holographic wavefront. This reduces the size, complexity and cost of the head-up display.

The windscreen of a vehicle typically has high transmissivity and it is not therefore usually desirable to apply optical coatings that improve waveguiding. However, the present disclosure relates to waveguiding of a holographic wavefront that, in some embodiments, uses at least one narrowband light source (e.g. laser for high coherence). Therefore, correspondingly narrowband filters can be applied to the windscreen without significantly degrading visibility across the visible spectrum. Furthermore, the windscreen of a vehicle typically has a complex curvature which makes it non-ideal for pupil expansion by waveguiding but when the hologram is characterised by distributing the image content in the spatial domain by angle in the hologram domain, the effects of the complex curvature are not catastrophic to image quality. In fact, the curvature merely causes a change in the correlation between position on the waveguide and position of the image content (or light angle within the holographic light field). More specifically, the angular distribution of the image content is either stretched or compressed in the hologram domain. These effects can be tolerated.

The 2D array of replicas may me formed by waveguiding the 1D array of replicas between the inside and outside surfaces of the windscreen.

Waveguiding may comprise a plurality of partial transmission-reflections at a plurality of different parts on the inside surface of the windscreen.

The method may further comprise arranging the hologram and display device to direct different continuous angular ranges of the holographic wavefront to a viewer within the vehicle from different parts of the inside surface of the windscreen.

The method may further comprise transforming the holographic wavefront into a meaningful image. The image content of the image may appear within the vehicle, outside the vehicle or both. The image may comprise a virtual image, real image and/or both.

The method may further comprise calculating the hologram such that, when illuminated, the hologram divides the content of the image in the spatial domain by angle in the hologram domain. The image content is delivered to the viewer in the hologram domain. That is, the holographic wavefront is delivered to the viewer. The viewer performs the hologram to image transform.

There is also disclosed a system comprising a light engine and windscreen of a vehicle. The light engine comprises a display device and first pupil expander. The display device is arranged to display a hologram of an image and spatially modulate light in accordance with the displayed hologram to form a holographic wavefront. The first pupil expander is arranged receive the holographic wavefront and replicate the holographic wavefront in a first direction to form a 1D array of replicas of the holographic wavefront. The windscreen of the vehicle is arranged to receive the 1D array of replicas of the holographic wavefront from the first pupil expander and expand the 1D array of replicas in a second direction to form a 2D array of replicas of the holographic wavefront. The second direction may be substantially orthogonal to the first direction.

The system may be configured to angularly distribute light within the holographic wavefront in accordance with spatial position within the image such that continuous angular ranges or "channels" of the holographic wavefront respectively correspond with continuous regions of the image. Different continuous angular ranges of the holographic wavefront may be received by a viewer from different parts of the windscreen. Different parts of the windscreen may correspond to a different number of internal reflections within the windscreen.

The windscreen and/or hologram may be arranged such that the replicas have substantially uniform intensity. The windscreen may comprises an optical element (e.g. coating such as dielectric stack) configured to increase the reflectivity of a surface of the windscreen within at least one narrowband of the visible spectrum. At least one narrowband may correspond to a wavelength of the spatially modulated light. The term "narrowband" may mean less than 20 nm or less than 10 nm such as 7+/−2 nm full-wave half-maximum.

In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field may also be called a holographic wavefront for avoidance of confusion with light field displays. The holographic light field or wavefront that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures:

FIG. 9 illustrates an embodiment comprising an initial step of pre-processing the target image before hologram calculation.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

In the present disclosure, the term "substantially" when applied to a structural units of an apparatus may be interpreted as the technical feature of the structural units being produced within the technical tolerance of the method used to manufacture it.

Conventional Optical Configuration for Holographic Projection

Figure 1:
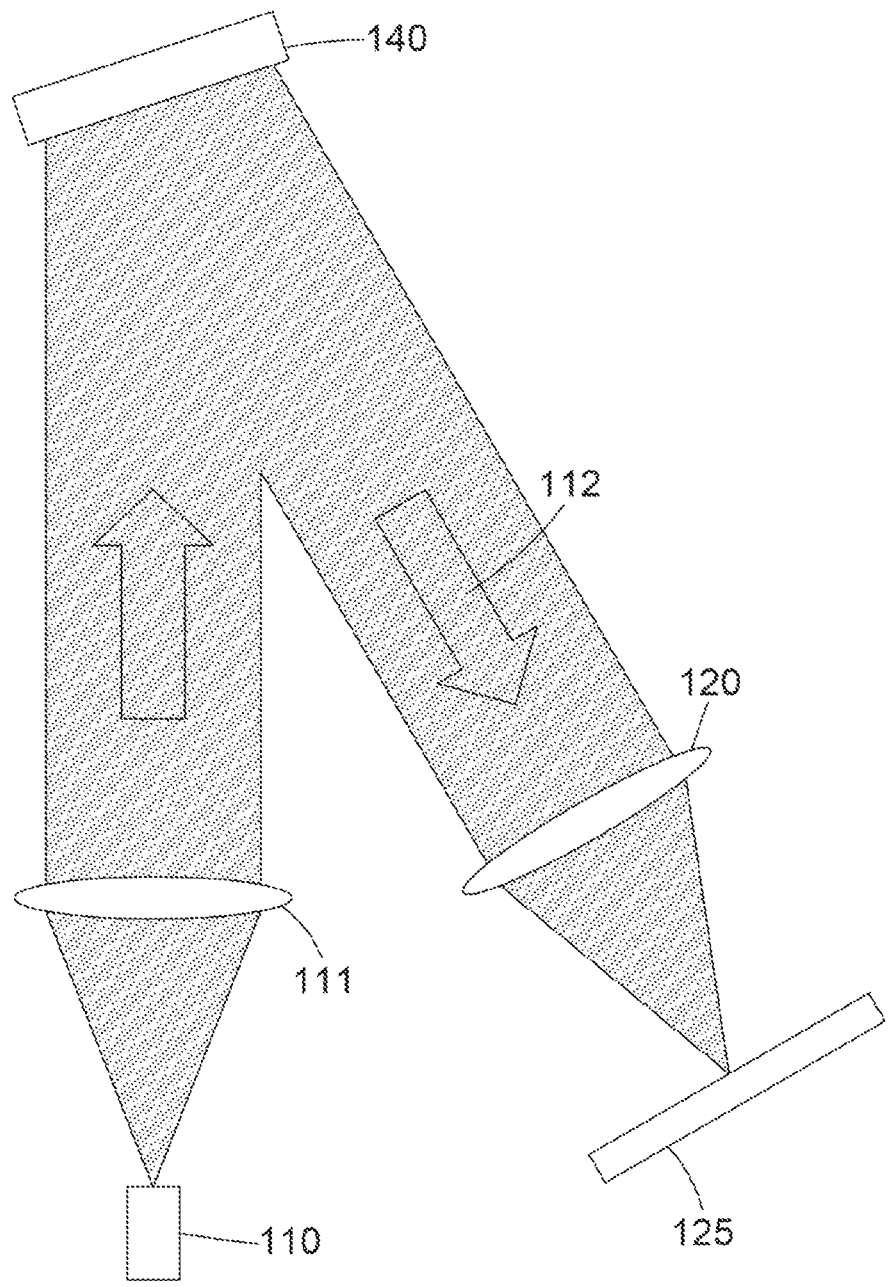
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform In some embodiments of the present disclosure, the lens of the viewer's eye performs the hologram to image transformation.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods.

In some embodiments, the hologram engine is arranged to exclude from the hologram calculation the contribution of light blocked by a limiting aperture of the display system. British patent application 2101666.2, filed 5 Feb. 2021 and incorporated herein by reference, discloses a first hologram calculation method in which eye-tracking and ray tracing are used to identify a sub-area of the display device for calculation of a point cloud hologram which eliminates ghost images. The sub-area of the display device corresponds with the aperture, of the present disclosure, and is used exclude light paths from the hologram calculation. British patent application 2112213.0, filed 26 Aug. 2021 and incorporated herein by reference, discloses a second method based on a modified Gerchberg-Saxton type algorithm which includes steps of light field cropping in accordance with pupils of the optical system during hologram calculation. The cropping of the light field corresponds with the determination of a limiting aperture of the present disclosure. British patent application 2118911.3, filed 23 Dec. 2021 and also incorporated herein by reference, discloses a third method of calculating a hologram which includes a step of determining a region of a so-called extended modulator formed by a hologram replicator. The region of the extended modulator is also an aperture in accordance with this disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Large Viewing Window and Long Throw Using Small Display Device

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other examples, the image is a real image formed by holographic reconstruction and the image is projected or relayed to the viewing plane. In these other examples, spatially modulated light of an intermediate holographic reconstruction formed either in free space or on a screen or other light receiving surface between the display device and the viewer, is propagated to the viewer. In both cases, an image is formed by illuminating a diffractive pattern (e.g., hologram or kinoform) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some embodiments, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position.

The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels).

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure encompasses non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window or eye-box. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram may also be a point cloud hologram. The hologram is described herein as routing light into a plurality of hologram channels to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically and uniquely, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels.

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffracted light field may be defined by a "light cone". Thus, the size of the diffracted light field (as defined on a two-dimensional plane) increases with propagation distance from the corresponding diffractive structure (i.e. display device). It can be said that the pupil expander/s replicate the hologram or form at least one replica of the hologram, to convey that the light delivered to the viewer is spatially modulated in accordance with a hologram.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

Light Channelling

The hologram formed in accordance with some embodiments, angularly-divides the image content to provide a plurality of hologram channels which may have a cross-sectional shape defined by an aperture of the optical system. The hologram is calculated to provide this channelling of the diffracted light field. In some embodiments, this is achieved during hologram calculation by considering an aperture (virtual or real) of the optical system, as described above.

Figure 2:
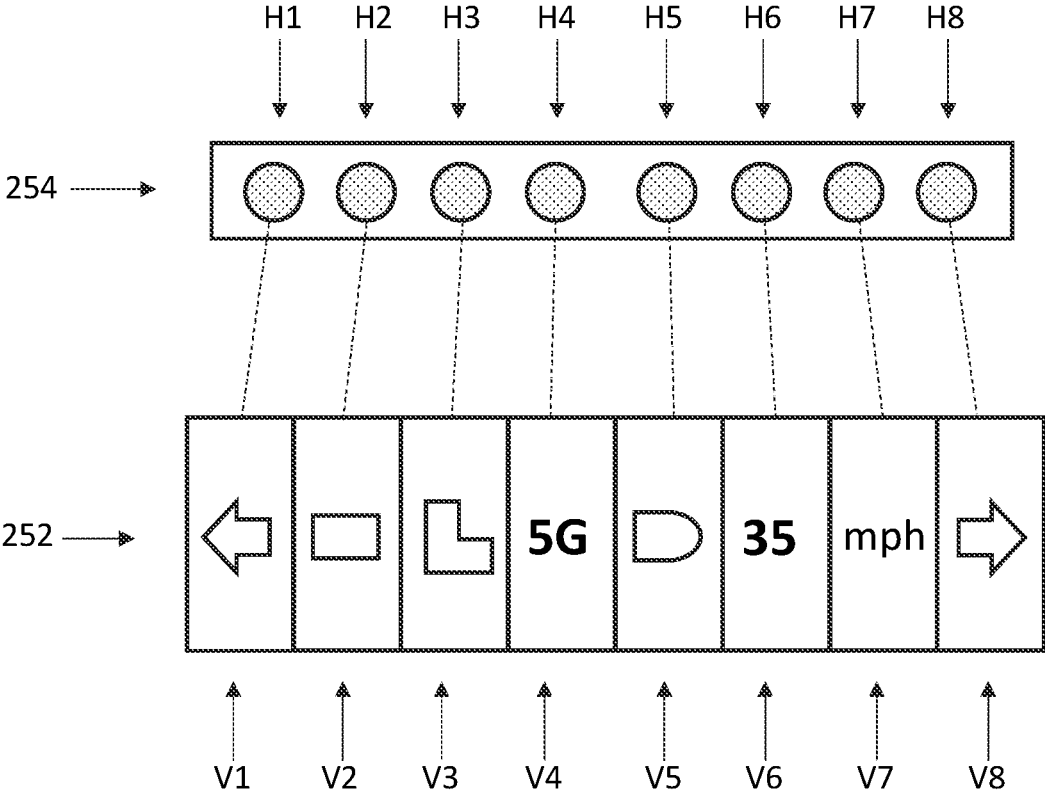
FIG. 2 shows an image for projection comprising eight image areas/components, V1 to V8, and cross-sections of the corresponding hologram channels, H1-H8.
Figure 3:
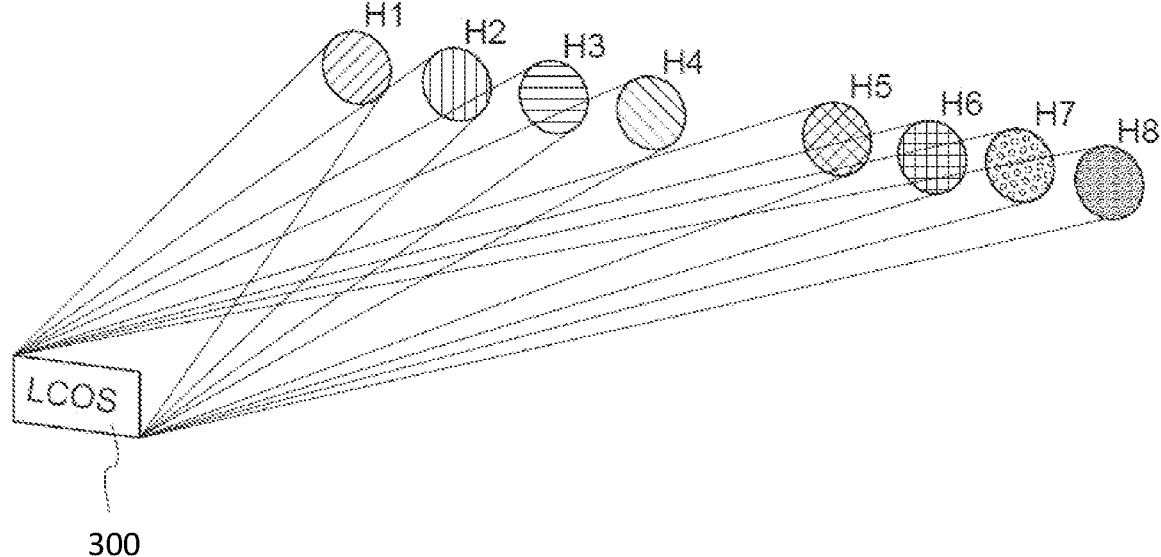
FIG. 3 shows a hologram displayed on an LCOS that directs light into a plurality of discrete areas.

FIGS. 2 and 3 show an example of this type of hologram that may be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channelling of light that it performs. This is illustrated in FIG. 3. Specifically, the hologram in this example directs light into a plurality of discrete areas. The discrete areas are discs in the example shown but other shapes are envisaged. The size and shape of the optimum disc may, after propagation through the waveguide, be related to the size and shape of an aperture of the optical system such as the entrance pupil of the viewing system.

Figure 4:
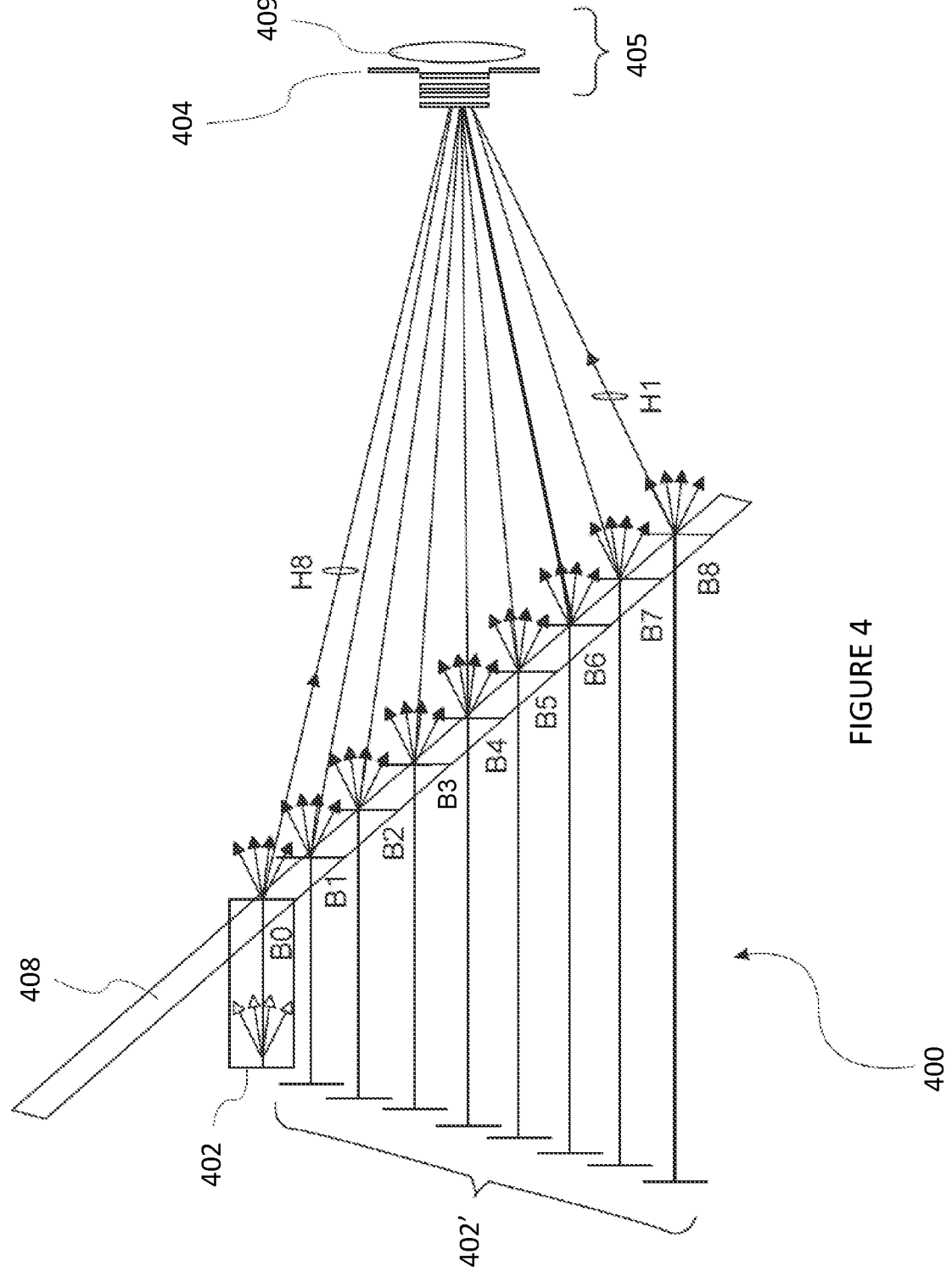
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 508 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

Although virtual images, which require the eye to transform received modulated light in order to form a perceived image, have generally been discussed herein, the methods and arrangements described herein can be applied to real images.

<center>Two-Dimensional Pupil Expansion—Example 1</center>

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

Figure 5A:
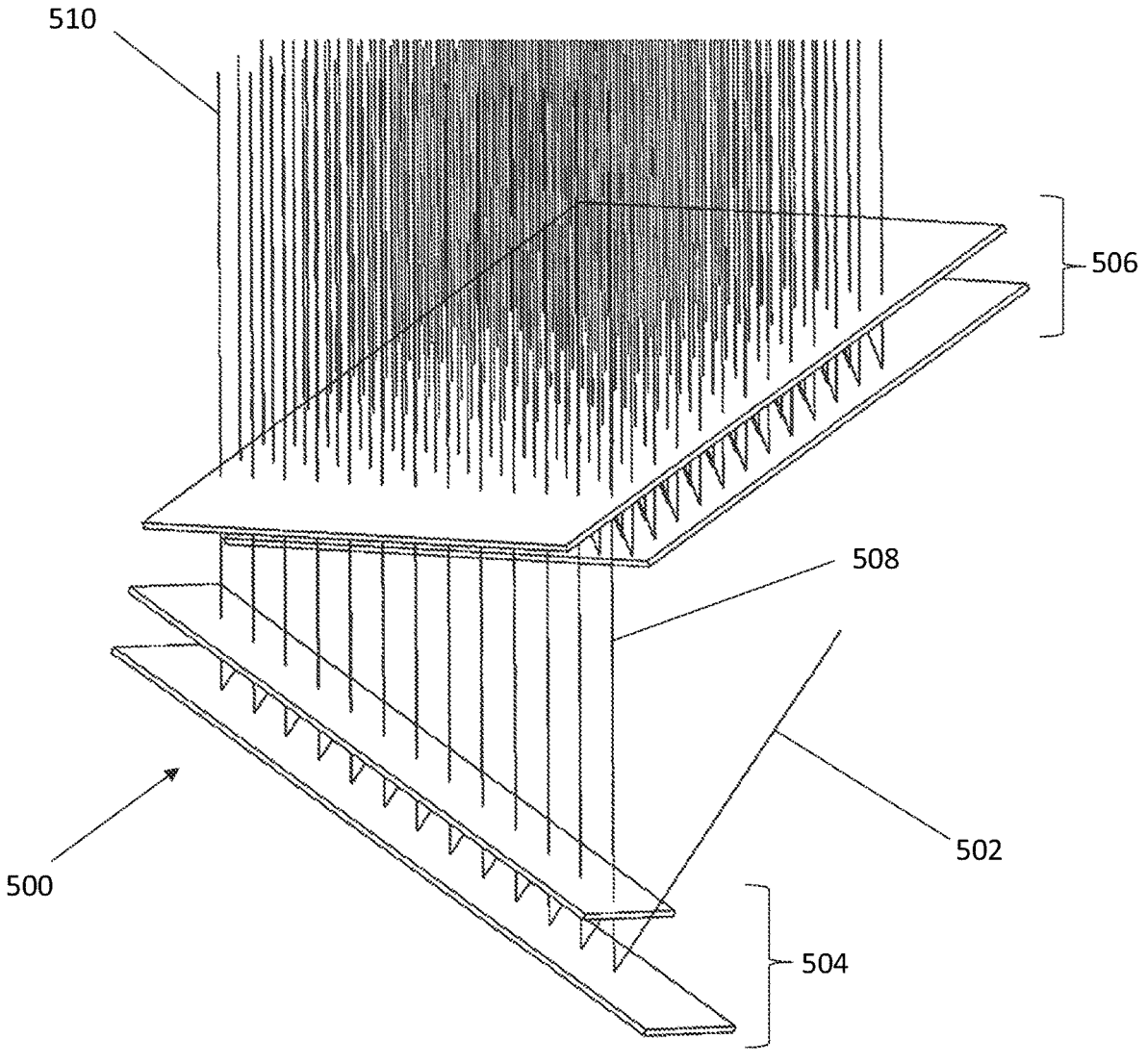
FIG. 5A shows a perspective view of a first example two-dimensional pupil expander comprising two replicators.

FIG. 5A shows a perspective view of a system 500 comprising two replicators, 504, 506 arranged for expanding a light beam 502 in two dimensions.

In the system 500 of FIG. 5A, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5A), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5A), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5A combine to provide a two-dimensional replicator (or, "two-dimensional pupil expander").

<center>Two-Dimensional Pupil Expansion—Example 2</center>

Figure 5B:
FIG. 5B shows a second example two-dimensional pupil expander comprising two replicators.

FIG. 5B shows a perspective view of a second example system 500 comprising two replicators 520, 540 arranged for expanding a light beam 522 in two dimensions.

In the second example system 500, the first replicator is a solid elongated waveguide 520 and the second replicator is a solid planar waveguide 540. In particular, the first replicator/waveguide 520 is arranged so that its pair of elongate parallel reflective surfaces 524a, 524b are perpendicular to the plane of the second replicator/waveguide 540.

The second example system 500 comprises an optical coupler arranged to couple light from an output port of first replicator 520 into an input port of the second replicator 540. In the illustrated arrangement, the optical coupler is a planar/fold mirror 530 arranged to fold or turn the optical path of light to achieve the required optical coupling from the first replicator to the second replicator. As shown in FIG. 5B, mirror 530 is arranged to receive light—comprising a one-dimensional array of replicas extending in the first dimension—from the output port/reflective-transmissive surface 524a of the first replicator/waveguide 520. The mirror 530 is tilted so as to redirect the received light onto an optical path to an input port in the (fully) reflective surface of second replicator 540 at an angle to provide waveguiding and replica formation along its length in the second dimension.

In the illustrated arrangement, the reflective-transmissive surface 524a of the first replicator 520 is adjacent the input port of the first replicator/waveguide 520 that receives input beam 522 at an angle to provide waveguiding and replica formation along its length in the first dimension. Thus, the input port of first replicator/waveguide 520 is positioned at an input end thereof at the same surface as the reflective-transmissive surface 524a. The skilled reader will understand that the input port of the first replicator/waveguide 520 may be at any other suitable position.

Accordingly, the arrangement of the second example system enables the first replicator 520 and the mirror 530 to be provided as part of a first relatively thin layer in a plane in the first and third dimensions (illustrated as an x-z plane). In particular, the size or "height" of the first planar layer—in which the first replicator 520 is located—in the second dimension (illustrated as the y dimension) is reduced. The mirror 530 is configured to direct the light away from a first layer/plane, in which the first replicator 520 is located (i.e., the "first planar layer"), and direct it towards a second layer/plane, located above and substantially parallel to the first layer/plane, in which the second replicator 540 is located (i.e. a "second planar layer"). Accordingly, it may be said that the first planar layer containing the first replicator 520 and the mirror 530 is within the footprint of the second planar layer containing second replicator 540. Thus, the overall size or "height" of the system—comprising the first and second replicators 520, 540 and the mirror 530 located in the stacked first and second layers/planes in the first and third dimensions (illustrated as an x-z plane)—in the second dimension (illustrated as the y dimension) is compact. The skilled reader will understand that many variations of the arrangement of FIG. 5B for implementing the present disclosure are possible and contemplated.

British patent application GB2113454.9, filed 21 Sep. 2021 and incorporated herein by reference, discloses an image projector comprising a more advanced two-dimensional pupil expander may which be arranged in accordance with this disclosure.

The image projector may be arranged to project a diverging or diffracted light field. In some embodiments, the light field is encoded with a hologram. In some embodiments, the diffracted light field comprises diverging ray bundles. In some embodiments, the image formed by the diffracted light field is a virtual image.

In some embodiments, the first pair of parallel/complementary surfaces are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of parallel surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In some embodiments, the display system comprises a display device—such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted or diverging light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field—including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

For the avoidance of doubt, the teachings of the present disclosure may be applied to one or both replicators of a two-dimensional pupil expander comprising two replicators.

Combiner Shape Compensation

An advantage of projecting a hologram to the eye-box is that optical compensation can be encoded in the hologram (see, for example, European patent 2936252 incorporated herein by herein). The present disclosure is compatible with holograms that compensate for the complex curvature of an optical combiner used as part of the projection system. In some embodiments, the optical combiner is the windscreen of a vehicle. Full details of this approach are provided in European patent 2936252 and are not repeated here because the detailed features of those systems and methods are not essential to the new teaching of this disclosure herein and are merely exemplary of configurations that benefit from the teachings of the present disclosure.

Control Device

The present disclosure is also compatible with optical configurations that include a control device (e.g. light shuttering device) to control the delivery of light from a light channelling hologram to the viewer. The holographic projector may further comprise a control device arranged to control the delivery of angular channels to the eye-box position. British patent application 2108456.1, filed 14 Jun. 2021 and incorporated herein by reference, discloses the at least one waveguide pupil expander and control device. The reader will understand from at least this prior disclosure that the optical configuration of the control device is fundamentally based upon the eye-box position of the user and is compatible with any hologram calculation method that achieves the light channelling described herein. It may be said that the control device is a light shuttering or aperturing device. The light shuttering device may comprise a 1D array of apertures or windows, wherein each aperture or window independently switchable between a light transmissive and a light non-transmissive state in order to control the delivery of hologram light channels, and their replicas, to the eye-box. Each aperture or window may comprise a plurality of liquid crystal cells or pixels.

Windscreen Waveguide

FIGS. 5A and 5B show a pair of orthogonal waveguides comprising a first waveguide and a second waveguide. FIGS. 5A and 5B do not show that, typically, the output from the pair of waveguides is directed to the viewing using an optical combiner. In the application of head-up display, the optical combiner may be the windscreen of the vehicle.

Figure 6:
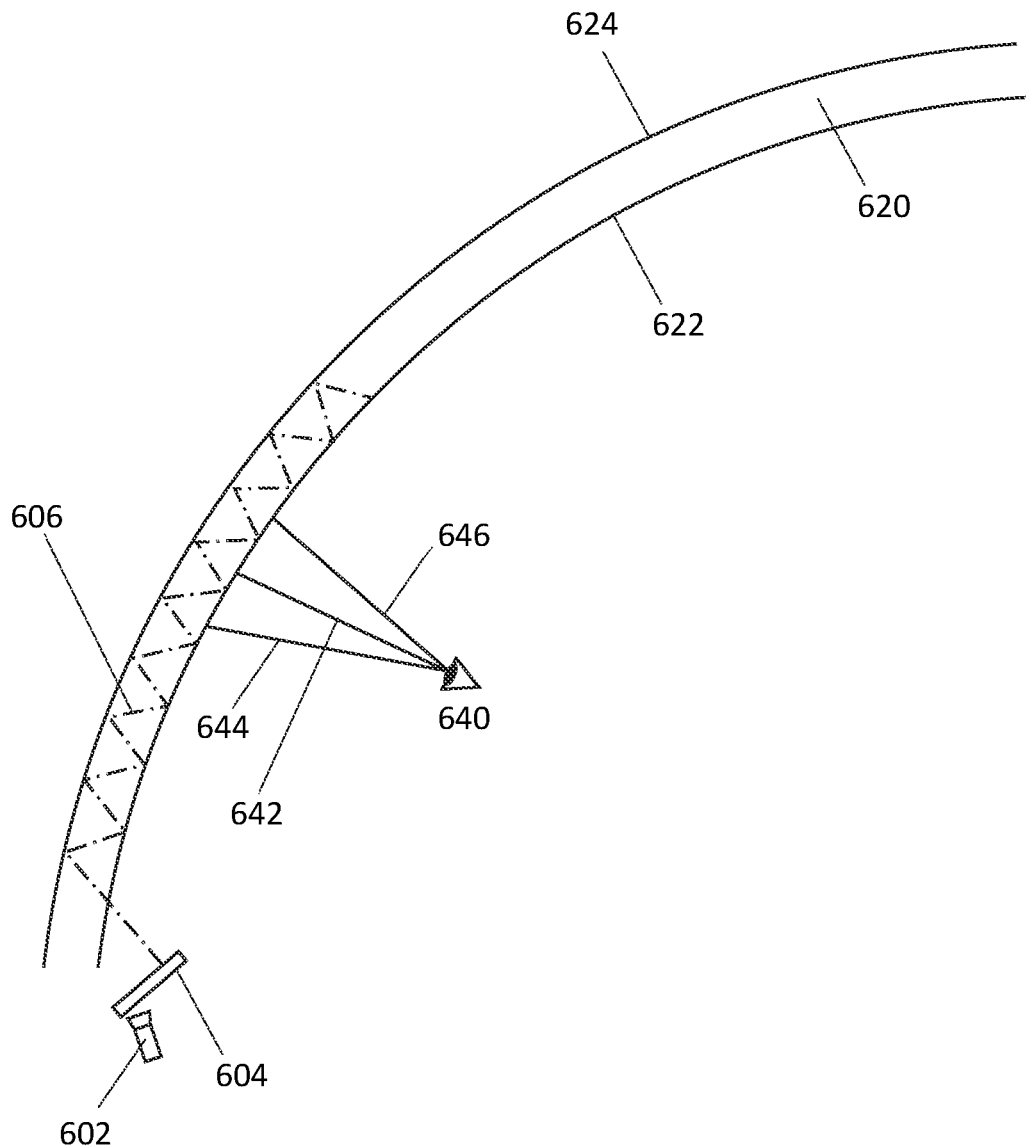
FIG. 6 shows an example of waveguide pupil expansion using a vehicle windscreen in accordance with this disclosure.

FIG. 6 shows a windscreen waveguide. FIG. 6 shows a projector 602 arranged to output a holographic wavefront in accordance with this disclosure. The projector 602 may comprise a hologram engine arranged to determine a hologram of an image for projection and a display device arranged to display the hologram and spatially modulate light in accordance with the displayed hologram. FIG. 6 further shows a first waveguide 604 which corresponds to waveguide 504 of FIG. 5A or waveguide 520 of FIG. 5B. The first waveguide 604 replicates the holographic wavefront in a first dimension to form a 1D array of replicas of the holographic wavefront. FIG. 6 further shows a windscreen 620 having an inside surface 622 and outside surface 624. The words "inside" and "outside" are not limiting and are merely used for convenience with reference to the host vehicle. FIG. 6 also shows a viewer 640 which may be the driver of the vehicle. A projection axis 606 shows the general direction the 1D array of replicas of the holographic wavefront is waveguided between the inside surface 622 and outside surface 624 of the windscreen 620. As the reader will understand from the description of FIG. 4, different angular ranges or channels of the holographic wavefront are delivered to the viewer 640 (through a pupil thereof) from different parts of the windscreen 620 in its function as the second waveguide. By way of example only, FIG. 6 shows a first axis 642 of a first angular range, a second axis 644 of a second angular range and a third axis 646 of a third angular range. As the reader will understand, in accordance with the channelling hologram of this disclosure, each different angular range corresponds to a different continuous area of the image. Three angular channels are represented in FIG. 6 by way of example only. The hologram and waveguide may be configured to deliver the full image content to the viewer (in the hologram domain) using any number of hologram channels and any number of replicas of the holographic wavefront. In summary, FIG. 6 therefore shows a windscreen of a vehicle being used as a second pupil expander to form a 2D array of replicas of the holographic wavefront from a 1D array of replicas.

In an embodiment, the outside surface 624 of the windscreen is coated (e.g. with a dielectric stack) to increase the reflectivity of the output surface to the holographic wavefront. In an embodiment, red, green and blue holographic wavefronts are waveguided by the windscreen to provide full colour display and the outside surface comprises a coating that provides a narrowband increase in the reflectivity at the discrete wavelengths of the projector. For example each narrowband may be only 7 nm in bandwidth such that the impact on the perceived colour balance of the real-world scene over the 200 nm visible range is not significantly distorted. This is possible because embodiments use narrowband light sources, such as laser diodes, to produce the holographic wavefronts because holography required coherence. In other embodiments, the head-up display is arranged such that the internal reflections within the windscreen satisfy the criterion for total internal reflection. In a further improvement explained in the following section, the hologram is modified to compensation for the changing replica intensity.

Compensating for Replica Intensity

Figure 7:
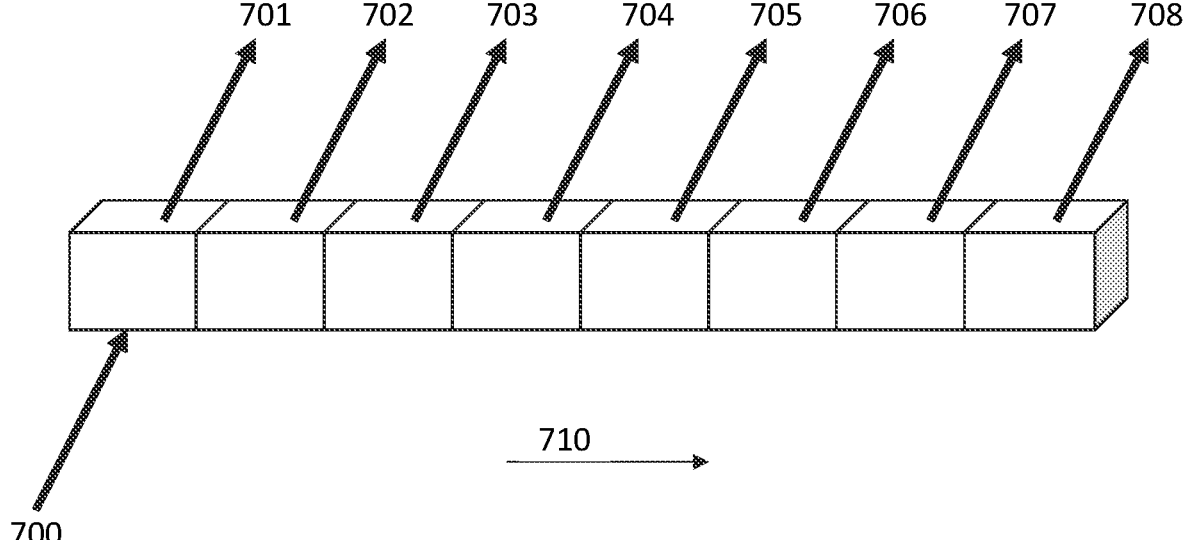
FIG. 7 shows an example waveguide pupil expander comprising eight emission zones.
Figure 8:
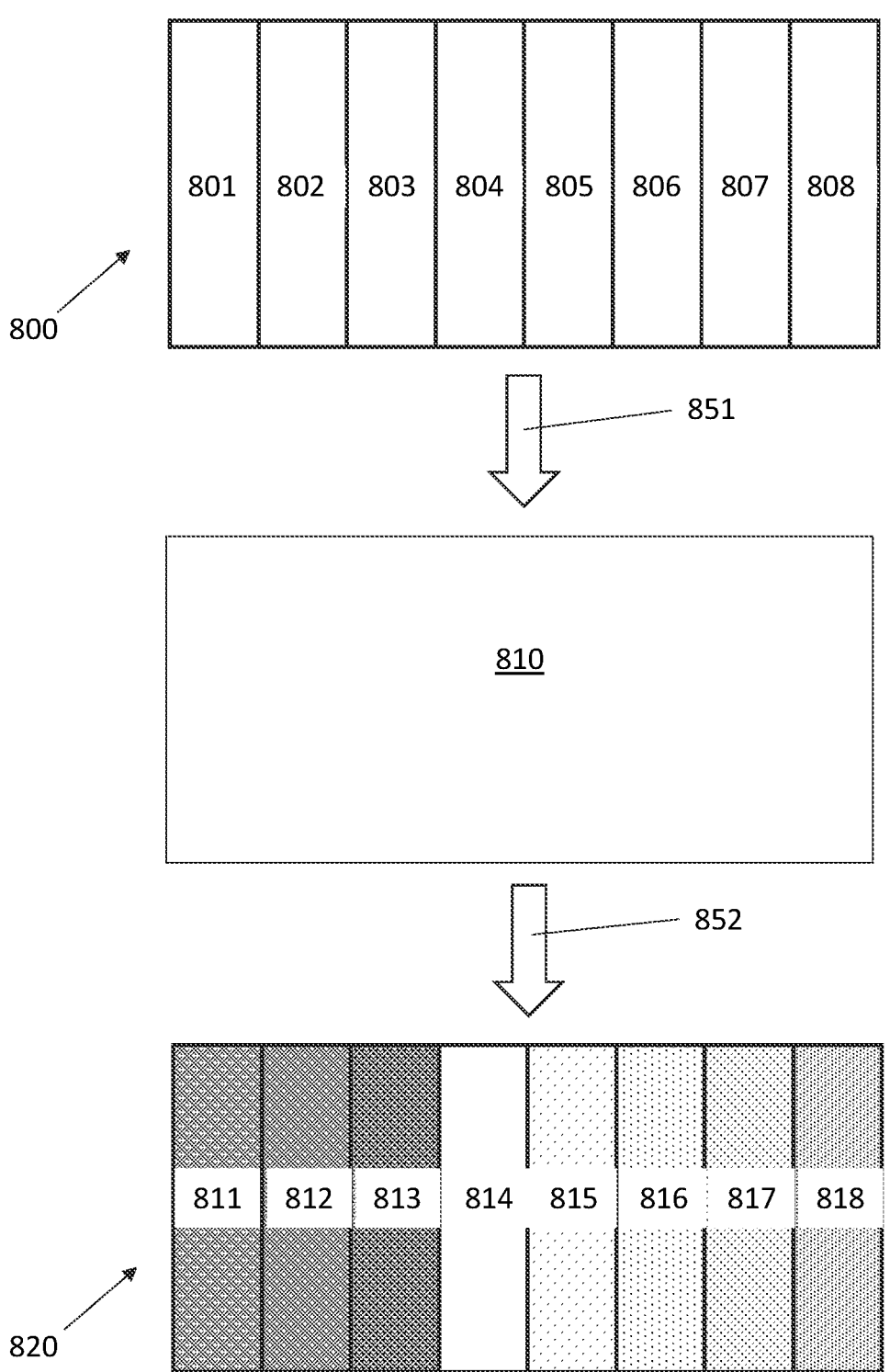
FIG. 8 illustrates a problem addressed by the present disclosure.

The output surface of each waveguide is partially reflective-transmissive in order that a portion (i.e. percentage of the intensity) of the holographic light field is output and a portion is internally reflected at each interaction with the output surface during waveguiding. A consequence of this approach to replicating the light field is that the intensity of the replicas decreases with each reflection. FIGS. 7 and 8 illustrate the point.

FIG. 7 shows an example waveguide arranged to having an input 700 and a plurality of light emissions 701 to 708 of the waveguide. Each emission is a replica of the holographic light field. It may also be said that each emission is a replica of the hologram. Each emission is also a replica of the pupil of the display device that displays the hologram and the waveguide may therefore be termed a pupil expander. That is, the plurality of emission zones provide pupil expansion. Each emission corresponds to a different number of internal reflections within the waveguide. For example, light emission 701 corresponds to zero internal reflections (i.e. direct transmission of the input light 700 through the waveguide), the light output from emission 702 corresponds to one internal reflection from the output surface of the waveguide and so on. Each emission occurs from a respective emission zone of the waveguide, as the reader will understand from the illustration. FIG. 7 shows the general direction of waveguiding 710 which is also the direction of pupil expansion.

FIG. 8 shows a target image 800 comprising a plurality of image regions 801 to 808 which are shown a vertical sections of the target image 800 by way of example only. The target image is an input image that the projector will project to a viewer. FIG. 8 further shows a hologram 810 of the target image 800 formed by a first step of calculating a hologram 851 comprising any suitable method such as an iterative phase retrieval or point cloud method. FIG. 8 also shows a second step of hologram illumination 852 to form a holographic reconstruction 820 of the target image 800 from the hologram 810. The holographic reconstruction 820 comprises the same vertical sections as the image 800. In a perfect system, the holographic reconstruction 820 is a perfect reproduction of the target image 800. The density of hatching used in the illustrated holographic reconstruction 820 is indicative of the relative intensity of the different vertical sections of holographic reconstruction 820 in this example. In this illustration, a high density of hatching indicates a low light level (i.e. relatively dark) and a low density of hatching indicates a high light level (i.e. relatively light). The hologram in accordance with this disclosure distributes the content of the image 800 by angle, as described in detail elsewhere herein. In further accordance with this disclosure, there is a correlation between the sections of the image and the emission zones. In FIG. 8, the correlation—by way of example only—is as follows:

| Image Section | Emission Number |
|---|---|
| 801 | 706 |
| 802 | 707 |
| 803 | 708 |
| 804 | 701 |
| 805 | 702 |
| 806 | 703 |
| 807 | 704 |
| 808 | 705 |

Table 1—example correlation between image sections and emission zones of the example projection system.

The person skilled in the art of optics will appreciate how, for example, ray tracing may be used to determine the correlation between the different sections of the image and the emission zones. The person skilled in the art will also appreciate that this correlation is dependent on the location of the viewer—e.g. a so-called eye-box position of the viewer within an eye-box area or volume.

FIG. 8 shows how the intensity of each image section in the holographic reconstruction 820 is dependent on the location of the emission zone from which it is emitted owing to the decrease in intensity with each successive internal reflection from the output surface. The fourth image section 814 has the greatest intensity because, as shown in Table 1, it corresponds to the first emission 701 having zero internal reflections. The third image section 813 has the lowest intensity (and is therefore shown as the darkest/most hatches) because it correlates to the eighth emission 708 having seven internal reflections.

In some embodiments, the transmissivity of the first surface at each emission zone, $T(n)$, in the direction of waveguiding satisfies the following equation:

$$T(n) = \frac{T(n-1)}{[1 - T(n-1)] \times [1 - L]} \tag{1}$$

wherein L is an optical loss factor of the waveguide material and n is the emission number. Equation 1 is merely an example of $T(n)$ and the present disclosure is not limited to equation 1. The skilled person will understand that the principles disclosed herein may be applied to any relationship between T and n.

In some examples, a graded coating (with variable transmissivity-reflectivity) is applied to the output surface in order to compensate for the decreasing intensity of the waveguided light with each internal reflection. For example, the coating may have an increasing transmissivity and decreasing reflectivity with each internal reflection in order that the emissions of the waveguide have uniform intensity.

This can necessitate a complex dielectric stack comprising more than 20 individual layers of different materials, most having varying thickness, particularly when three single-colour (e.g. red, green and blue) holographic light fields are required for colour projection.

FIG. 9 illustrates an embodiment of the present disclosure. FIG. 9 largely corresponds to FIG. 8 but includes an initial step 950 of modifying the target image. The initial step 950 comprises individually changing the intensity of each image section 801 to 808 based on the intensity loss associated with the corresponding number of internal reflections. The length of the vertical arrows in the modified image 800' indicate the increase in intensity associated with each image section. The process of modifying the target image 800 may comprise multiplying each image section 801 to 808 by a respective gain or loss factor. The process may involve changing a grey level associated with each pixel of the image section. For example, modifying the third image section 803 of the target image may comprise multiplying each pixel value of the third image section 803 by a gain factor such as a gain factor of 2. This has the effect of boosting the intensity of the last emission 708 of the waveguide (as per Table 1) in order to compensate for the loss of intensity caused by the seven prior internal reflections from the output surface. The opposing surface of the waveguide may be substantially fully reflective. The reader will understand how each image section may be processed using a different gain or loss factor based on the corresponding number of internal reflections. For the avoidance of doubt, each pixel value of an image section is multiplied by the same gain or loss factor in accordance with this example. FIG. 8 further shows a hologram 810' of the modified image 800' formed by a step of calculating a hologram 951 comprising any suitable method such as an iterative phase retrieval or point cloud method. FIG. 9 also shows a third step of hologram illumination 952 to form a holographic reconstruction 820' of the target. As shown in FIG. 9, in accordance with this disclosure, the intensity of the holographic reconstruction 820' is more uniform than that of holographic reconstruction 820 of FIG. 8 and is an improved reproduction of the target image 800.

In some embodiments, the amplification or gain applied to (the pixel values of) each respective image section is a function of the number of reflections (from/by the output surface) associated with the corresponding emission zone. In some embodiments, the amplification or gain applied to (the pixel values of) each respective image section increases with the number of reflections (from/by the output surface) associated with the corresponding emission zone and/or increases with propagation or waveguiding distance. In some embodiments, the gain factor substantially compensates for T(n)—an example of which is given in equation 1.

In other embodiments, it is not necessary to calculate the modified image 800' and, instead the method of determining the hologram comprises a step that modulates the contribution of data points or light waves based on the corresponding emission zone. For example, in a point cloud method, the intensity of the light waves that are simulated in order to form the point cloud hologram may be moderated based on a corresponding emission zone. The person skilled in the art will appreciate how the concept of compensating in the hologram for the intensity losses during waveguiding may be implemented in a variety of different ways. Whilst the invention may be implemented in a variety of different ways, an underlying principle may be expressed as changing (e.g. uniformly increasing or decreasing) the intensity of at least one angular channel of the holographic light field based on the transmissivity of the corresponding emission zone.

As mentioned above, in some embodiments, the hologram is calculated using a modified Gerchberg-Saxton type algorithm as described in British patent application 2112213.0, filed 26 Aug. 2021, which is incorporated herein by reference. This algorithm is particularly synergistic with the present disclosure. The method calculates a sub-hologram corresponding to each replica and so the full dynamic range of the computational Fourier transform can be independently utilised for each replica. That is, any difficulties that might ordinarily exist during hologram calculation because the intensity of each successive replica is decreasing are not experienced because each sub-hologram is calculated independently and can therefore benefit from the full dynamic range that is available in the compute.

In these embodiments, the hologram algorithm can cope well with the large losses which may occur at each reflection when the windscreen is used as a waveguide. This is because the method comprises calculating a sub-hologram of each hologram replica using a computational Fourier transform providing high dynamic range and floating point numbers.

For the avoidance of doubt, whilst the method of modifying the hologram to compensate for a decrease in the intensity of the replicas with waveguiding is highly compatible with the method of using a windscreen of a vehicle as a waveguide pupil expander, the two methods work in isolation and it is not essential that they are combined.

Additional Features

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A projection system comprising:
   a display device arranged to display a hologram of an image and spatially modulate light in accordance with the hologram to form a holographic light field;
   a hologram engine arranged to calculate the hologram, wherein the hologram is arranged to angularly distribute light within the holographic light field in accordance with spatial position within the image such that continuous angular ranges of the holographic light field respectively correspond with continuous regions of the image;

a waveguide comprising a pair of parallel reflective surfaces arranged to waveguide the holographic light field therebetween, wherein a first surface of the pair of parallel reflective surfaces is partially reflective-transmissive so as to form an output comprising a plurality of emission zones for the holographic light field, wherein the hologram engine is arranged to modify the hologram to at least partially compensate for a decrease in intensity of the emission from each successive emission zone of the waveguide caused by the partial reflection-transmissions at the first surface during waveguiding.

2. A projection system as claimed in claim 1 arranged to form a plurality of viewing positions within a viewing region, wherein the entire holographic light field is receivable through a viewing pupil at each viewing position but different continuous angular ranges of the holographic light field are receivable through the viewing pupil from different emission zones of the waveguide.

3. A projection system as claimed in claim 1 wherein at least partially compensating for the decrease in intensity of the emission from each successive emission zone comprises changing the intensity of at least one angular channel of the holographic light field.

4. A projection system as claimed in claim 1 wherein at least partially compensating for the decrease in intensity of the emission from each successive emission zone comprises changing the intensity of at least one continuous region of a target image of the hologram prior to calculation of the hologram.

5. A projection system as claimed in claim 3 wherein changing the intensity comprises applying a gain or loss factor.

6. A projection system as claimed in claim 1 wherein calculation of the hologram comprises a plurality of iterations of a phase retrieval algorithm.

7. A projection system as claimed in claim 1 wherein calculation of the hologram comprises a point cloud method.

8. A projection system as claimed in claim 1 wherein a second surface of the pair of parallel reflective surfaces is substantially fully reflective.

9. A projection system as claimed in claim 1 further comprising a viewer tracking system arranged to determine a location of a viewer within a viewing window downstream of the waveguide, wherein the hologram engine is arranged to determine a correlation between angular channels of the holographic light field and the emission zones based on the determined location of the viewer.

10. A projection system as claimed in claim 1 wherein the transmissivity of the first surface at each emission zone, T(n), in the direction of waveguiding satisfies the following equation:

$$T(n) = \frac{T(n-1)}{[1 - T(n-1)] \times [1 - L]}$$

wherein L is an optical loss factor of the waveguide material.

11. A method of replicating a holographic light field using a waveguide, wherein the waveguide comprises a pair of parallel reflective surfaces arranged to waveguide the holographic light field therebetween, wherein a first surface of the pair of parallel reflective surfaces is partially reflective-transmissive so as to form an output comprising a plurality of emission zones for the holographic light field in the direction of waveguiding and the method comprises:

calculating a hologram arranged to angular distribute light within the holographic light field in accordance with image position such that angular channels within the holographic light field respectively correspond with continuous regions of the image;

modifying the hologram to at least partially compensate for a decrease in intensity of the emission from each successive emission zone of the waveguide caused by the partial reflection-transmissions at the first surface during waveguiding; and displaying the hologram and spatially modulating light in accordance with the hologram to form the holographic light field.

12. A method as claimed in claim 11 further comprising receiving, by a viewer disposed within a viewing window downstream of the waveguide, through a pupil thereof, different angular channels of the holographic light field from different emission zones of the waveguide.

13. A method as claimed in claim 11 further comprising modifying the global intensity of at least one angular channel of the holographic light field.

14. A method as claimed in claim 11 further comprising changing the global intensity of at least one continuous region of a target image of the hologram prior to calculation of the hologram.

15. A method as claimed in claim 11 further comprising determining a location of a viewer within a viewing window downstream of the waveguide and determining a correlation between angular channels of the holographic light field and the emission zones based on the determined location of the viewer.

16. A method as claimed in claim 11 wherein the waveguide is arranged to form a plurality of viewing positions within a viewing region, wherein the entire holographic light field is receivable through a viewing pupil at each viewing position but different continuous angular ranges of the holographic light field are receivable through the viewing pupil from different emission zones of the waveguide.

17. A method as claimed in claim 11 wherein at least partially compensating for the decrease in intensity of the emission from each successive emission zone comprises changing the intensity of at least one angular channel of the holographic light field.

18. A method as claimed in claim 11 wherein at least partially compensating for the decrease in intensity of the emission from each successive emission zone comprises changing the intensity of at least one continuous region of a target image of the hologram prior to calculation of the hologram.

19. A method as claimed in claim 11 wherein calculation of the hologram comprises a plurality of iterations of a phase retrieval algorithm.

20. A method as claimed in claim 11 wherein calculation of the hologram comprises a point cloud method.

* * * * *